United States Patent [19]

Miles

[11] 4,288,815
[45] Sep. 8, 1981

[54] VIDEO PICTURE PROCESSING INCLUDING MOVEMENT DETECTION

[75] Inventor: Barry D. R. Miles, Newbury, England

[73] Assignee: Quantel Limited, Berkshire, England

[21] Appl. No.: 130,356

[22] Filed: Mar. 14, 1980

[30] Foreign Application Priority Data

Mar. 22, 1979 [GB] United Kingdom ............... 10114/79

[51] Int. Cl.³ ............................................. H04N 7/18
[52] U.S. Cl. ................................... 358/105; 358/167
[58] Field of Search ................ 358/105, 160, 167, 136

[56] References Cited

U.S. PATENT DOCUMENTS 3,988,533 10/1976 Mick et al. .......................... 358/105
4,107,736 8/1978 Lowry et al. ....................... 358/105

Primary Examiner—Richard Murray
Attorney, Agent, or Firm—Dowell & Dowell

[57] ABSTRACT

A video movement detector suitable for detecting picture movement and/or noise on a video signal. A first detector detects differences frame by frame on a portion of picture having a plurality of picture points from more than one line. A second detector detects differences frame by frame from a portion of picture having a plurality of picture points from the same line, and a third detector detects differences frame by frame from a portion of a picture comprising a single picture point. Movement is determined to have taken place when the differences measured by the respective detectors exceed predetermined thresholds. The selected thresholds are typically of different values to provide the capability of distinguishing between noise and movement in varying conditions. The movement detection arrangement can be used to control picture manipulation during processing such as in a noise reduction system, standards conversion or picture size change arrangements.

14 Claims, 8 Drawing Figures

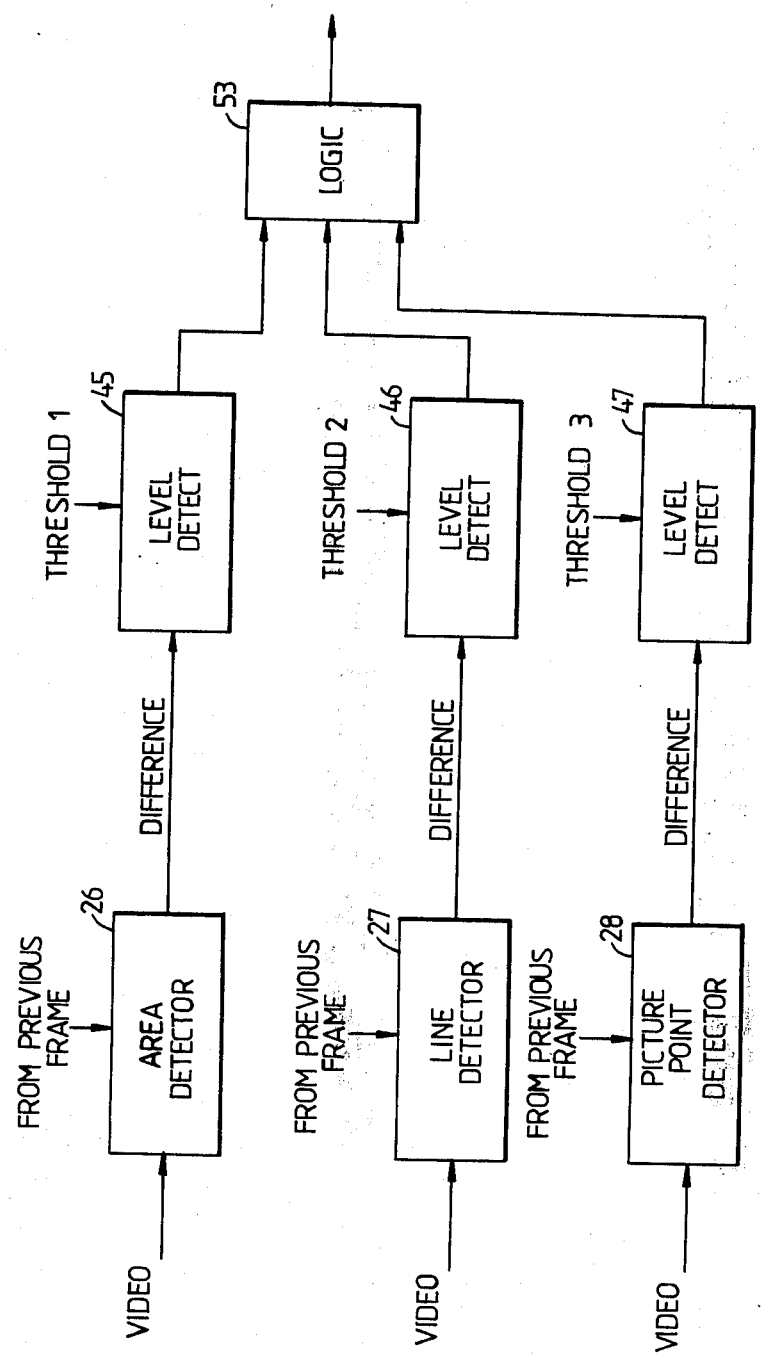

VIDEO PICTURE PROCESSING INCLUDING MOVEMENT DETECTION

BACKGROUND TO THE INVENTION

The invention relates to the processing of video pictures in dependence on detected picture movement.

In British Patent Application No. 42751/76 (U.S. Pat. No. 4,163,249) picture processing arrangements such as those for reducing picture noise on an incoming signal are disclosed. As explained therein, whilst noise reduction can be used to enhance a T.V. picture, when movement of a part or all of the picture content occurs then some means for temporarily curtailing the noise reduction mechanism is required to avoid 'smearing' of the image and this means includes a movement detector. With small amounts of movement the detector may not be able to distinguish such movement from noise.

With processing arrangements which include a frame store (e.g. noise reduction), when handling NTSC pictures, for example, due to the alternating nature of the chroma information frame by frame, errors can be introduced if picture information from the previous frame is used with information on the incoming frame.

The invention is concerned with improvements to various aspects of picture processing including noise and movement detection and chroma correction.

SUMMARY OF THE INVENTION

According to the invention there is provided a video detector system for detecting picture movement and/or noise on a video signal, said detector system including first detector means for detecting differences frame by frame on a portion of picture having a plurality of picture points from more than one line, second detector means for detecting differences frame by frame on a portion of picture having a plurality of picture points from the same line, third detector means for detecting differences frame by frame on a portion of picture comprising a single picture point, and output means for receiving an output from said first, second and third detectors to determine that movement has occurred in dependence on the outputs from said first, second and third detector means.

Inversion means may be provided to selectively invert chrominance information prior to receipt by a processor and selectively to invert chrominance information at the output from the processor.

The inversion means may comprise a single inverter switchable between the input and output of the processor or a pair of inverters.

Further according to the invention there is provided a method of detecting picture movement on video data comprising detecting differences frame by frame on a portion of picture having a plurality of picture points from more than one line, detecting differences frame by frame on a portion of picture having a plurality of picture points from the same line, detecting differences frame by frame on a portion of picture comprising a single picture point, so as to determine that movement has occured in dependence on the outputs from said first, second and third detection steps.

BRIEF DESCRIPTION OF DRAWINGS

The various aspects of the invention will now be described by way of example with reference to the accompanying drawings in which:

FIG. 5 shows the combined movement/noise detector system.

DESCRIPTION OF PREFERRED EMBODIMENTS

Figure 1:
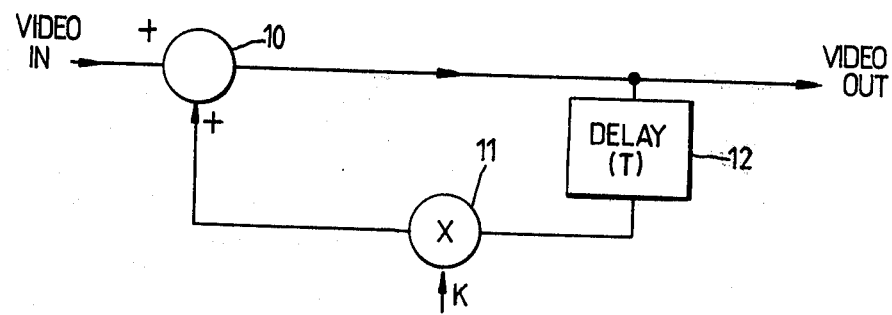
FIG. 1 shows video processing system in the form of a basic noise reduction system.

A typical video processor in the form of a noise reduction scheme is shown in FIG. 1.

To reduce the noise on an incoming picture, a portion of the video information from the previous frame delayed by delay 12 is added in adder 10. Because of the random nature of the noise by successively adding back a portion of the output then noise is substantially reduced. The amount added is determined by the value of K selected for multiplier 11, ($K<1$). The delay period T is one frame period and the delay comprises a frame store. With this arrangement however, the gain is dependent on the selected value of K.

Figure 2:
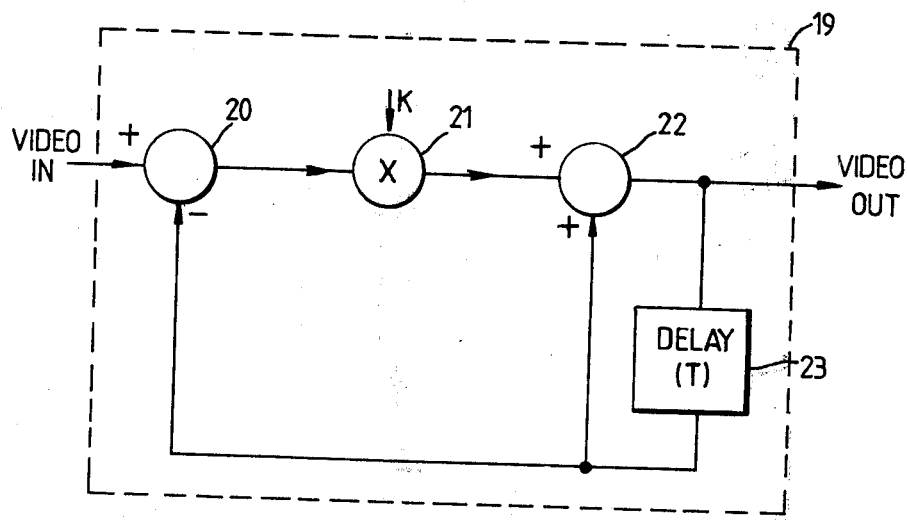
FIG. 2 shows the system modified to provide unity gain.

To provide unity gain irrespective of the coefficient selected, the basic scheme is modified as shown in the processor 19 of FIG. 2.

The delayed video is subtracted from the incoming video in subtractor 20. The resultant output is multiplied in multiplier 21 by coefficient K and added to the delayed output in added 22. The delay 23 comprises a frame store.

As previously mentioned when picture movement is occurring the noise reduction must be curtailed. To detect movement it has been proposed to substract the information on the previous frame from the incoming information for that particular picture point. If a large difference is detected then movement is assumed to have occured. If a small difference is detected this is assumed to be noise. If no difference is detected it is taken that no movement or noise is occuring. A problem arises when a small amount of movement is occurring which is mistaken in the detector as being noise. typically if the image is a girl's face, the movement of her hair may be mistaken for noise and slight degradation of the image can occur.

Figure 3:
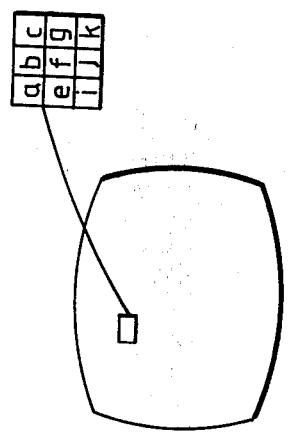
FIG. 3 shows a patch of the video frame comprising nine picture points.

An improved movement detector will now be described which can discriminated more readily between noise and various types of movement so as to provide accurate movement detection over a wider range of picture conditions. FIG. 3 shows a nine picture point 'patch' of the video image. Whilst a nine picture point patch has been chosen, other size patches could be used. This patch comprises nine picture points a, b, c, as a level for a threshold detector for the picture point of interest, associated with the 'patch'.

Thus if the patches from frames 1 and 2 are identical then the output will be zero irrespective of picture content. If patch 1 is moved with respect to patch 2 then every picture point will be different and the change will be large.

Where noise is present without movement there is an averaging effect of noise (i.e. RMS effect) so that the system is less sensitive to noise. This example shows that this type of detector can more easily distinguish between noise and movement.

Another type of detector is also included in the system.

Figure 4:
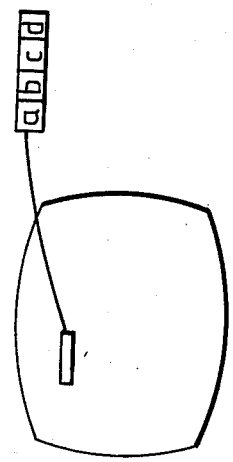
FIG. 4 shows a single line patch of the video frame.

FIG. 4 shows the provision of movement detection by considering picture points from one line only. FIG. 4 shows a patch comprising four picture points a, b, c, d from one line. Although four picture points on the line have been chosen other numbers of points could be used. Vertical movement will still be detected on a single line. The output from the detector can be used to switch on and off the coefficient K or alternatively to vary coefficient K in the noise reduction system as described below.

As a third mechanism for movement detection, use is made of single picture point analysis (e.g. point a) for determining any differences. FIG. 5 shows the combined system.

The first detector mechanism 26 produces an indication of movement between incoming video and corresponding data from a previous frame in a portion of picture from more than one line. The measured difference is received by a threshold sensor 45 (e.g. comparator) which produces an output level indicative of whether the difference measured by detector 26 exceeds the selected threshold level.

The second detector 27 receives picture information from picture points along a line from current and previous frames and measures any difference therebetween which difference is compared by sensor 46 with a predetermined threshold.

The third detector 28 receives picture information from a single picture point from a current and earlier frame and determines any difference therebetween which difference is again compared with a threshold in sensor 47.

The output from threshold sensors 45–47 are received by suitable switching logic 53 to provide an output indicative that movement or noise is occuring.

Figure 6:
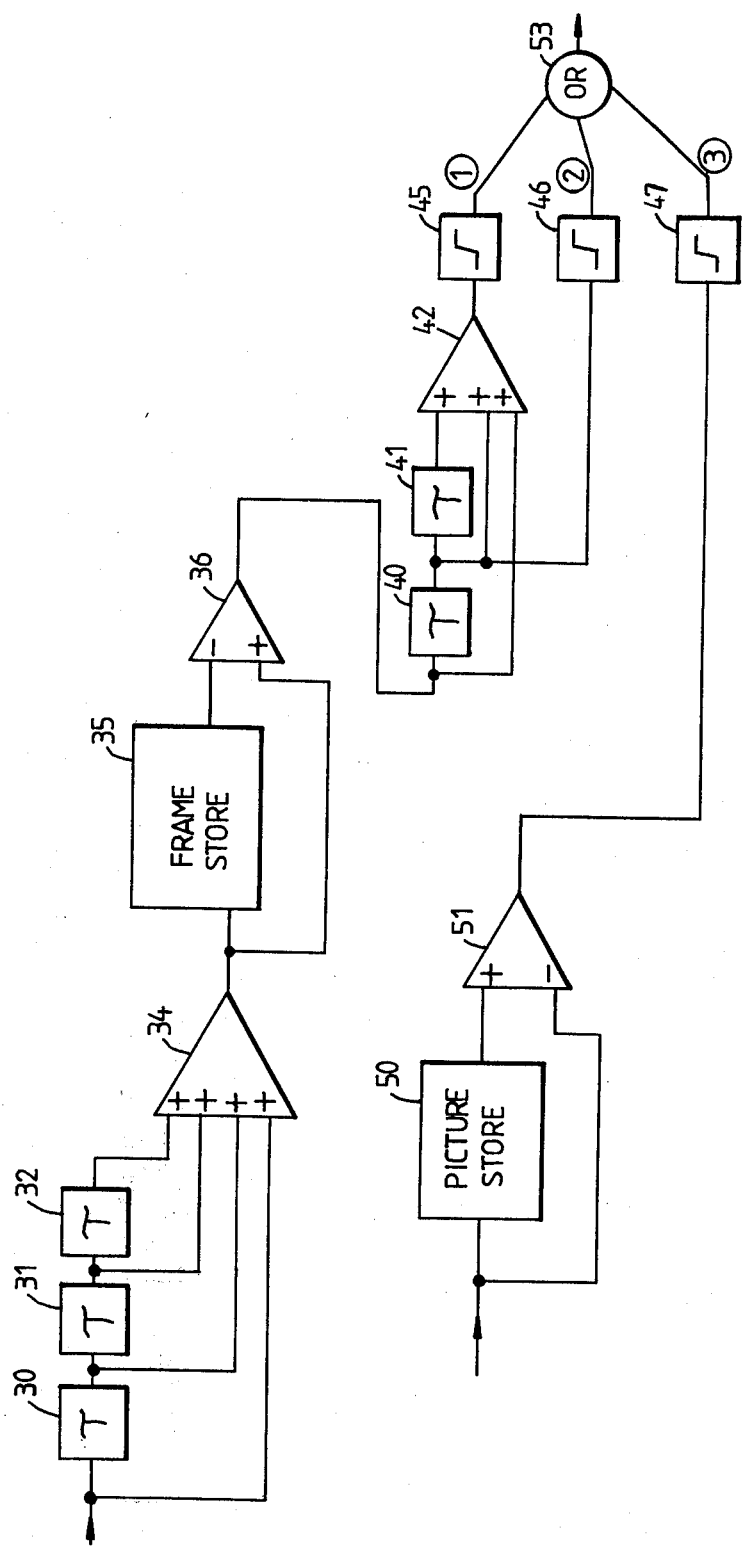
FIG. 6 shows one arrangement for realising the movement and/or noise detector system of FIG. 5.

An arrangement for providing all three movement detection mechanisms of FIG. 5 is shown in FIG. 6. The video data input is received by picture point delays 30, 31, 32. Thus four picture points arrive simultaneously at adder 34 which sums the four picture points and this summed value is stored in frame store 35. The output from the current frame is substracted from the stored data in subtractor 36. The difference data passes to picture point delays 40, 41. Thus three such difference values arriving simultaneously at the inputs of adder 42 are summed and passed to threshold detector 45. This provides the first detection mechanism.

The output from delay 40 is also taken to a further threshold level detector 46. This provides the second mechanism.

The single picture point mechanism for providing the third detection arrangement is achieved by using the normal picture store 50 associated with processing systems which manipulate data from current and previous frames. In the noise reduction systems of FIGS. 1 and 2 such a picture store is shown schematically as frame delay 12 and 23 respectively. The output of store 50 is substracted from current data for the same picture point in subtractor 51 and this is used as the input to threshold detector 47. The outputs from the threshold level detectors 45, 46, 47 are received by an OR gate 53 the output of which signifies movement whenever one of the detectors 45, 46 or 47 has its threshold exceeded.

Figure 7:
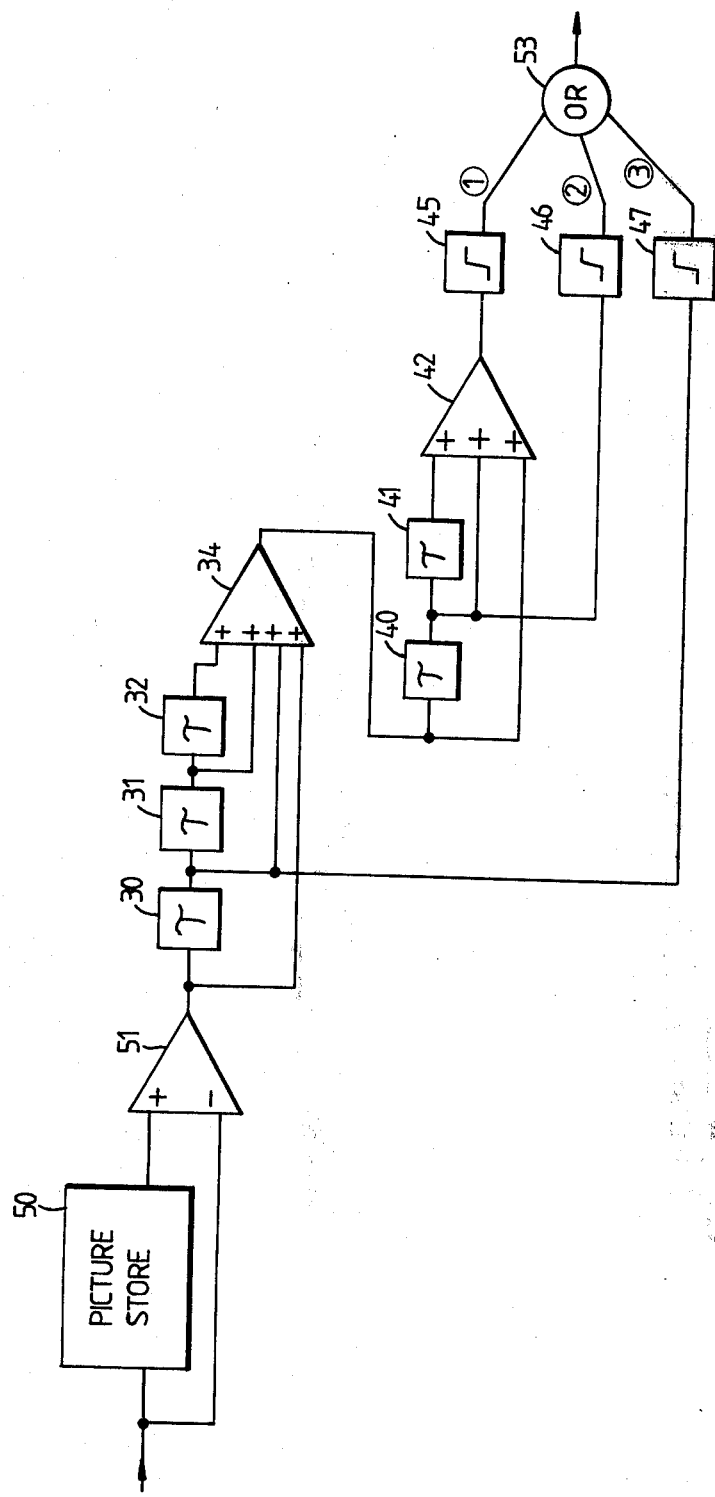
FIG. 7 shows an alternative arrangement to that of FIG. 6.

An alternative embodiment is shown in FIG. 7 where a picture store is used without the necessity of providing an additional frame store. The difference between single picture points from stored and current frames are subtracted in subtractor 51. The difference output is received by picture point delays 30, 31, 32 and thus the four picture point differences are summed in adder 34. The adder output is received by delays 40, 41 and pass to adder 42 and threshold detector 45 as before. The output from delay 40 is received by detector 46 as before and the single picture point difference for detector 47 is provided this time from the output of delay 30. The outputs from threshold detector 45, 46, 47 are received by OR gate 53 as before.

It has been found that although all three mechanisms operate continuously together, they do not keep interacting in their detection but rather more accurately detect movement under a variety of picture movement and noise situations.

The thresholds set for detectors 45, 46, 47 are not set to the same level but expediently the single picture point detection threshold in detector 47 is set higher than that of detector 45. Detector 46 is set between the thresholds of 45 and 47.

The detector mechanism for supplying the input for threshold detector 45 has good noise immunity as it operates on the averaging principle and is good at detecting any movement of large objects within the picture which have moved. It is not very good at detecting small objects even if a great deal of movement has occured.

However the single picture point detection input to threshold detector 47 is good at catching small objects which have moved substantially, but has poor noise immunity, and thus has its threshold set higher. The picture point mechanism driving detector 46 has intermediate noise immunity and allows the system to catch movement of objects which could have been missed by the other mechanisms driving detectors 46 and 47.

It will be appreciated that FIGS. 6 and 7 provide just two ways of achieving the desired detection function and other configurations could be adopted with shared elements as required.

The provision of the three mechanisms working together provides a system which can cope more easily with picture and noise conditions than before, and has been shown that contrary to what may have been expected the three mechanisms do not cause interaction between all the threshold detectors so that the threshold detectors are triggering the OR gate together, but rather each plays a part in exclusively detecting movement under varying conditions.

With regard to the detector mechanism feeding threshold detector 45 for example as in the FIGS. 6 and 7 arrangements, it is also possible to use this calculation to determine the signal to noise ratio of the video input. This can be carried out by examining the early part of the frame (i.e. test lines and reference signals) which may carry information but those parts are chosen which do not move. Thus if this information is processed using the above arrangements when no movement is occuring the summation gives an indication of the amount of noise present. Thus the output of adder 42 for example can be used to provide this indication. The value of the coefficient K needed for noise reduction can be selected in dependence on the amount of noise present. If the S/N ratio is good then the amount of noise reduction required can be reduced. Thus the value of the coefficient K can be selected in dependence on the degree of noise measured.

Figure 8:
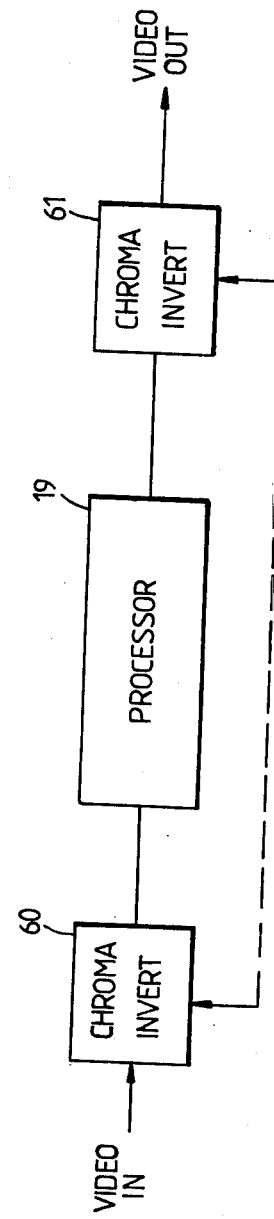
FIG. 8 shows an arrangement for inverting chroma information.

When handling NTSC pictures for example it is preferable to invert the chroma from the output of the frame store delay 23 of FIG. 2 because of the alternating chroma inversion frame by frame if any error is to be avoided when processing this incoming frame. If a comb filter is used at the output of frame delay 23 the chroma will be shifted down by 1 line and whilst this may not cause problems in other applications, in the noise reduction arrangement described and with a high degree of filtering the chroma will appear to 'cry' on the screen (i.e. run down the screen) because the line shift of the chroma will be remembered and successively repeated. To avoid this problem the arrangement of FIG. 8 is provided. A chroma inverter 60 is provided at the system input prior to the noise reducer processor 19 and a chroma inverter 61 is provided at the output of noise reducer 19. The inverters 60, 61 are ganged so that they change every other frame. The alternating chroma at each frame will be changed by the inverter 60 on alternate frames to ensure the information is received continuously in the same sense. This has the effect that the video reaching the noise reducer can be considered as being monochrome. At the output of the noise reducer, every other frame will be inverted in a similar way to the input to reintroduce the alternating chroma. The chroma inverters can now comprise comb line decoders without causing the chroma 'crying' effect mentioned above. It is also possible to use just a single chroma inverter and switch this frame by frame from the input to the output of the noise reducer.

Although the processor 19 with associated movement detection has been described generally with regard to a noise reduction arrangement, such a processor could be of a type used for picture size change, line standards conversion or other processors where the need to have knowledge of picture movement is required. U.S. Pat. No. 4,163,249 discloses various processing arrangements and examples of the way in which various elements of the system can be realised.

I claim:

1. A video detector system for detecting picture movement and/or noise on a video signal, said detector system including:
    first detector means for detecting differences frame by frame on a portion of picture having a plurality of picture points from more than one line;
    second detector means for detecting differences frame by frame on a portion of picture having a plurality of picture points from the same line;
    third detector means for detecting differences frame by frame on a portion of picture comprising a single picture point, and
    output means for receiving an output from said first, second and third detectors to determine that movement has occured in dependence on the outputs from said first, second and third detector means.

2. A system according to claim 1, wherein the first detector is adapted to have a detection threshold higher than said second and third detectors and said second detector is adapted to have a detection threshold between that of said first and third detectors.

3. A system according to claim 1, wherein the first detector is adapted to provide an output indicative of the signal to noise ratio of the video signal when no picture movement is occuring.

4. A system according to claim 1, wherein the first detector means includes picture point delay means for providing a delay between picture points within the designated picture portion, adder means for adding the picture points within the designated portion, and subtractor means for determining the difference between the portion from the present and a previous frame.

5. A system according to claim 4, wherein the subtractor means is provided prior to the delay means.

6. A system according to claim 4, wherein the subtractor means is provided after said adder means.

7. A system according to claim 1, wherein the second detector means includes picture point delay means for providing a delay between picture points within the designated picture portion, adder means for adding the picture points within the designated portion and subtractor means for determining the difference between the portion from the present and a previous frame.

8. A system according to claim 1, wherein the output means comprises threshold means for receiving the output from said first, second and third detector means to determine whenever an output thereof exceeds a predetermined threshold and gating means are provided to produce an output indicative of movement whenever the threshold means detects that a threshold has been exceeded.

9. A system according to claim 1, wherein frame storage means are provided to make available picture point data from a previous frame.

10. A system according to claim 1, wherein processing means are provided for manipulating picture data from current and previous frames in dependence on any movement detected therebetween.

11. A system according to claim 10, wherein the processing means comprises a noise reduction system.

12. A system according to claim 10, wherein chrominance inversion means are provided prior to and following the processing means to selectively invert chrominance information on the video signal.

13. A method of detecting picture movement on video data comprising detecting differences frame by frame on a portion of picture having a plurality of picture points from more than one line, detecting differences frame by frame on a portion of picture having a plurality of picture points from the same line, detecting differences frame by frame on a portion of picture comprising a single picture point, so as to determine that movment has occured in dependence on the outputs from said first, second and third detection steps.

14. A method according to claim 13, wherein the first detection step is selected to have a detection threshold higher than said second and third detection steps and said second detection step is selected to have a detection threshold between that of said first and third detection steps.

* * * * *